(12) United States Patent
Yang

(10) Patent No.: US 10,437,484 B2
(45) Date of Patent: Oct. 8, 2019

(54) DATA PROTECTING METHOD, MEMORY CONTROL CIRCUIT UNIT AND MEMORY STORAGE DEVICE

(71) Applicant: PHISON ELECTRONICS CORP., Miaoli (TW)

(72) Inventor: Kai-Hsiang Yang, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 256 days.

(21) Appl. No.: 15/080,592

(22) Filed: Mar. 25, 2016

(65) Prior Publication Data

US 2017/0220273 A1    Aug. 3, 2017

(30) Foreign Application Priority Data

Jan. 30, 2016   (TW) .............................. 105103063 A

(51) Int. Cl.
*G06F 3/06*      (2006.01)
*G06F 12/02*     (2006.01)

(52) U.S. Cl.
CPC .......... *G06F 3/0619* (2013.01); *G06F 3/0655* (2013.01); *G06F 3/0688* (2013.01); *G06F 12/0246* (2013.01); *G06F 2212/7201* (2013.01)

(58) Field of Classification Search
None
See application file for complete search history.

(56) References Cited

U.S. PATENT DOCUMENTS

| 2012/0005558 | A1* | 1/2012 | Steiner ................ | G06F 11/1072 714/773 |
| 2012/0059981 | A1* | 3/2012 | Flynn ........................ | G06F 9/52 711/103 |
| 2015/0339188 | A1* | 11/2015 | Hu ....................... | G06F 11/1072 714/704 |
| 2016/0141047 | A1* | 5/2016 | Sehgal ............... | G11C 16/3427 365/185.02 |

* cited by examiner

*Primary Examiner* — Adam M Queler
*Assistant Examiner* — Edmund H Kwong
(74) *Attorney, Agent, or Firm* — JCIPRNET

(57) ABSTRACT

A data protecting method, a memory control circuit unit and a memory storage device are provided. The method includes repeatedly reading data from a first physical programming unit of a first physical erasing unit during an initialization operation after the memory storage device is powered on, wherein the first physical programming unit is the last programmed physical programming unit before the memory storage device is powered off. The method also includes updating a logical-physical mapping table according to the first physical programming unit if a number of error bits of data read each time is not greater than an error bits amount threshold and a reading count of the first physical programming unit is greater than a predetermined count.

18 Claims, 10 Drawing Sheets

DATA PROTECTING METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 105103063, filed on Jan. 30, 2016. The entirety of the above-mentioned patent application is hereby incorporated by reference herein and made a part of this specification.

BACKGROUND

Technical Field

The present invention relates to a data protecting method, and more particularly, to a data protecting method of a rewritable non-volatile memory module, and a memory control circuit unit and a memory control circuit unit using the same.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., a flash memory) ideal to be built in the portable multi-media devices as cited above.

In general, when programming data into the rewritable non-volatile memory module, the rewritable non-volatile memory module may show an unstable state if the memory storage device is powered off when the programming is almost completed. After the memory storage device is powered on, even if the data programmed before power off may be correctly read during an initialization operation after the memory storage device is enabled, reading errors may still occur on the data programmed before power off in actual operation after the initialization operation is expired due to the unstable state of the rewritable non-volatile memory module. Accordingly, it is one of the major issues for person skilled in the art as how to prevent the reading errors caused by the unstable state of the rewritable non-volatile memory module.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data protecting method, a memory control circuit unit and a memory storage device, which are capable of preventing reading of uncorrectable data from the unstable physical programming unit.

In an exemplary embodiment, a data protecting method for a memory storage device is provided. The memory storage device has a rewritable non-volatile memory module. The rewritable non-volatile memory module includes a plurality of physical erasing units. Each of the physical erasing units includes a plurality of physical programming units. The data protecting method includes: repeatedly reading data from a first physical programming unit of a first physical erasing unit among the physical erasing units during an initialization operation after the memory storage device is powered on, wherein the first physical programming unit is the last programmed physical programming unit before the memory storage device is powered off, and the data of the first physical programming unit belongs to a logical programming unit. The data protecting method also includes: determining whether the number of error bits of the data read each time is greater than an error bits amount threshold. If the number of error bits is not greater than the error bits amount threshold and a repeatedly reading count is greater than a predetermined count, a mapping relation of the first physical programming unit and the logical programming unit is recorded into a logical-physical mapping table.

In an exemplary embodiment, the memory control circuit unit for controlling a rewritable non-volatile memory module is provided. The rewritable non-volatile memory module includes a plurality of physical erasing units, and each of the physical erasing units includes a plurality of physical programming units. The memory control circuit unit includes a host interface, a memory interface and a memory management circuit. The host interface is configured to couple to a host system. The memory interface is configured to couple to the rewritable non-volatile memory module. The memory management circuit is coupled to the host interface and the memory interface. The memory management circuit is configured to repeatedly read data from a first physical programming unit of a first physical erasing unit among the physical erasing units during an initialization operation after the memory storage device is powered on, wherein the first physical programming unit is the last programmed physical programming unit before the memory storage device is powered off, and the data of the first physical programming unit belongs to a logical programming unit. Furthermore, the memory management circuit is further configured to determine whether the number of error bits of the data read each time is greater than an error bits amount threshold. The memory management circuit is further configured to record a mapping relation of the first physical programming unit and the logical programming unit into a logical-physical mapping table if the number of error bits is not greater than the error bits amount threshold and a repeatedly reading count is greater than a predetermined count.

In an exemplary embodiment, the memory storage device including a connection interface unit, a rewritable non-volatile memory module and a memory control circuit unit is provided. The connection interface unit is configured to couple to a host system. The rewritable non-volatile memory module includes a plurality of physical erasing units. The memory control circuit unit is coupled to the connection interface unit and the rewritable non-volatile memory module. The memory control circuit unit is configured to repeatedly read data from a first physical programming unit of a first physical erasing unit among the physical erasing units during an initialization operation after the memory storage device is powered on, wherein the first physical programming unit is the last programmed physical programming unit before the memory storage device is powered off, and the data of the first physical programming unit belongs to a logical programming unit. Furthermore, the memory control circuit unit is further configured to determine whether the number of error bits of the data read each time is greater than an error bits amount threshold. The memory control circuit unit is further configured to record a mapping relation of the first physical programming unit and the logical programming unit into a logical-physical mapping table if the number of error bits is not greater than the error bits amount threshold and a repeatedly reading count is greater than a predetermined count.

Based on the above, during the initialization operation after the memory storage device is enabled, the reading operation may be repeatedly performed on the physical programming unit which is possibly in the unstable state and whether the read data is the correctable data may be determined. In addition, the read correctable data may be stored in to the additional physical erasing unit. As a result, reading of the uncorrectable data from the unstable physical programming unit may be prevented to ensure reliability and correctness of the data.

To make the above features and advantages of the invention more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
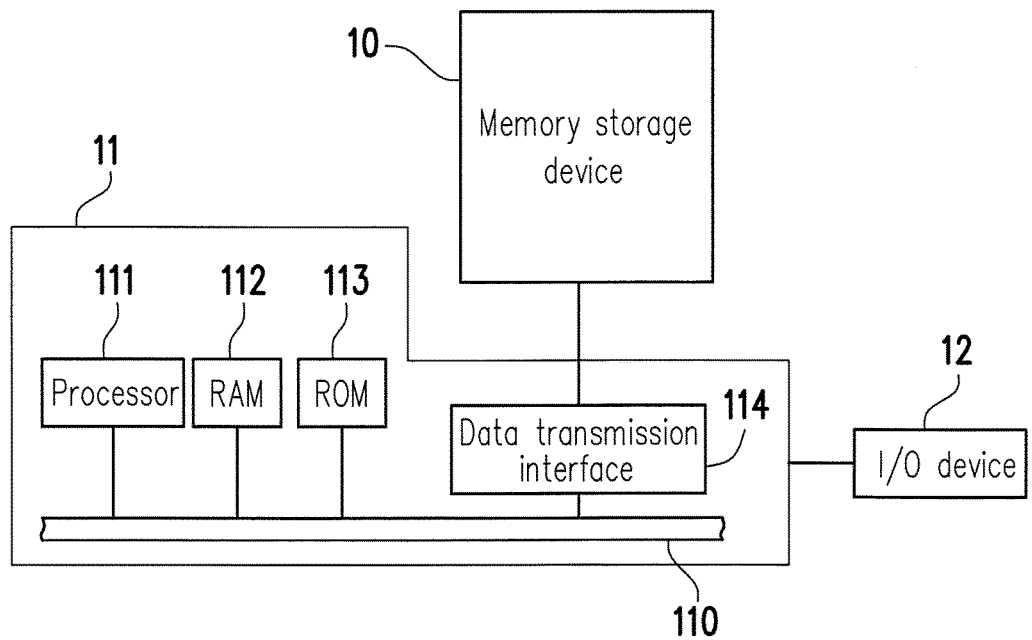
FIG. 1 is a schematic diagram illustrating a host system, a memory storage device and an input/output (I/O) device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also known as a memory storage system) includes a rewritable non-volatile memory module and a controller (also known as a control circuit unit). The memory storage device is usually configured together with a host system so that the host system may write data into the memory storage device or read data from the memory storage device.

Figure 2:
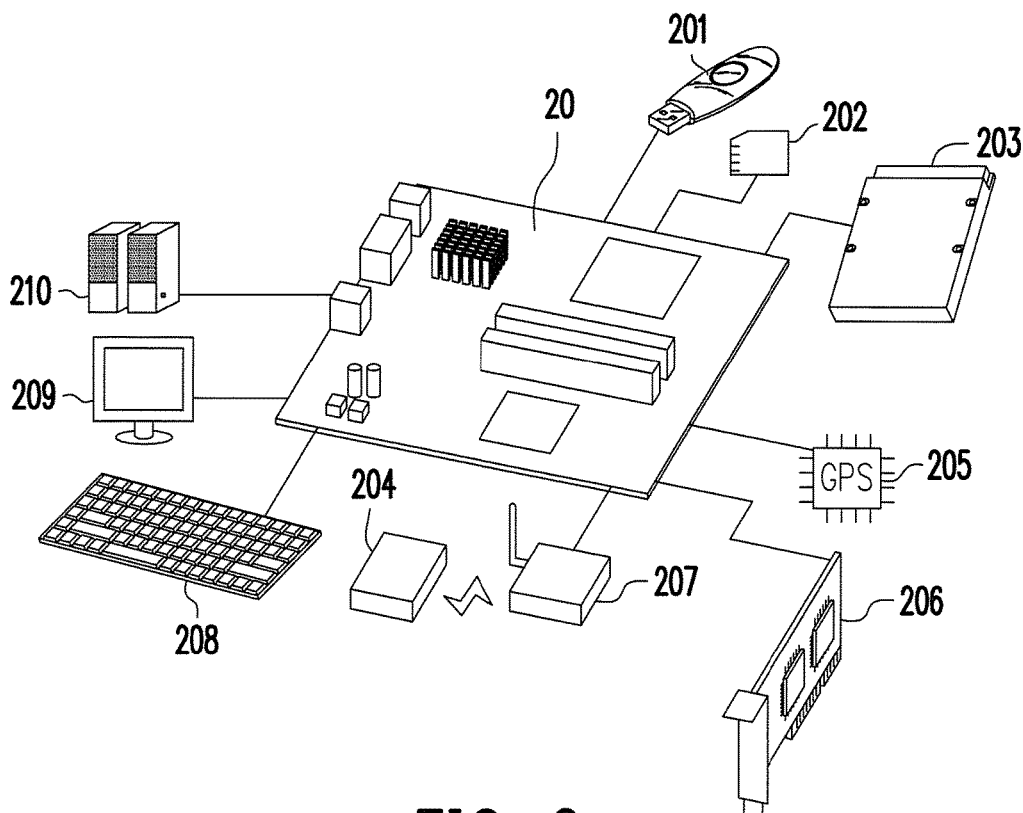
FIG. 2 is a schematic diagram illustrating a host system, a memory storage device and an input/output (I/O) device according to another exemplary embodiment.

FIG. 1 is a schematic diagram illustrating a host system, a memory storage device and an input/output (I/O) device according to an exemplary embodiment, and FIG. 2 is a schematic diagram illustrating a host system, a memory storage device and an input/output (I/O) device according to another exemplary embodiment.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can write data into the memory storage device 10 or read data from the memory storage device 10 through the data transmission interface 114. Further, the host system 111 is coupled to an I/O device 12 through the system bus 110. For example, the host system 11 can transmit output signals to the I/O device 12 or receive input signals from I/O device 12 through the system bus 110.

In this exemplary embodiment, the processor 111, the RAM 112, the ROM 113 and the data transmission interface 114 are disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication Storage) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 through the wireless transmission device 207.

Figure 3:
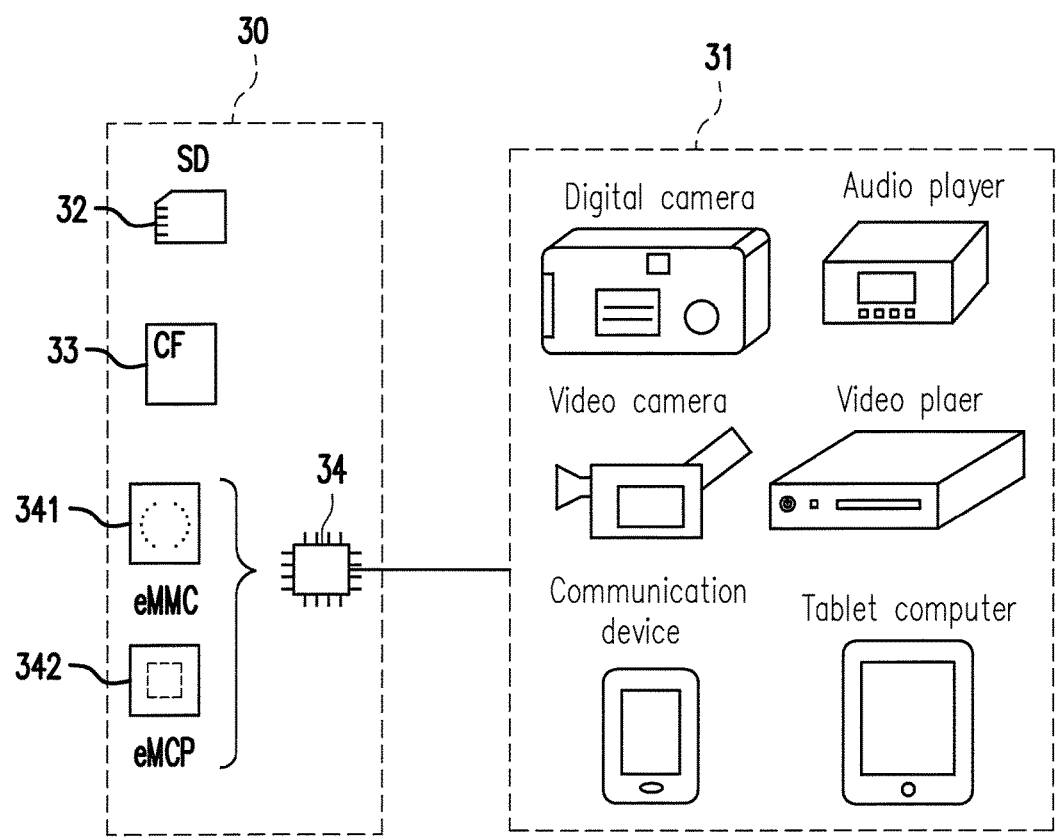
FIG. 3 is a schematic diagram illustrating a host system and a memory storage device according to another exemplary embodiment.

In an exemplary embodiment, aforementioned host system may be any systems capable of substantially cooperating with the memory storage device for storing data. Although the host system is illustrated as a computer system in foregoing exemplary embodiment; however, FIG. 3 is a schematic diagram illustrating a host system and a memory storage device according to another exemplary embodiment. Referring to FIG. 3, in another exemplary embodiment, a host system 31 may also be a system including a digital camera, a video camera, a communication device, an audio player, a video player or a tablet computer, whereas a memory storage device 30 can be various non-volatile memory devices used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
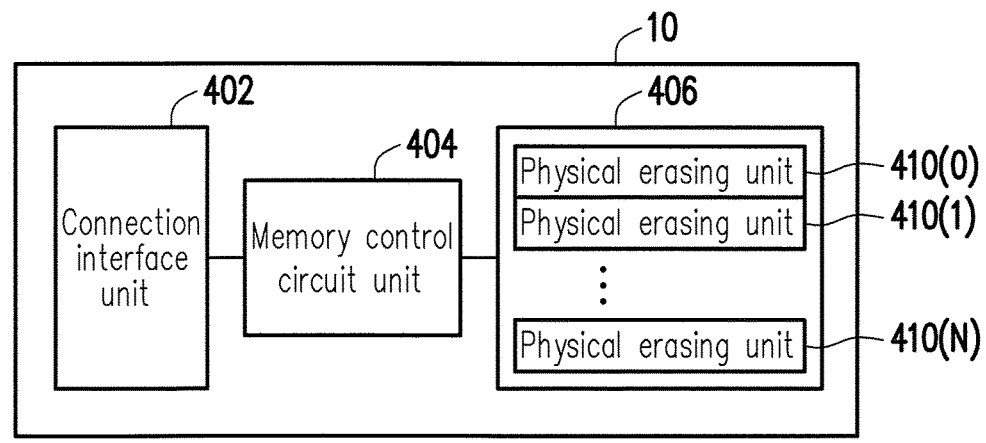
FIG. 4 is a schematic block diagram illustrating a host system and a memory storage device according to an exemplary embodiment.

FIG. 4 is a schematic block diagram illustrating a host system and a memory storage device according to an exemplary embodiment.

Referring to FIG. 4, the memory storage device 10 includes a connection interface unit 402, a memory control circuit unit 404 and a rewritable non-volatile memory module 406.

In this exemplary embodiment, the connection interface unit 402 is compatible with a SATA (Serial Advanced Technology Attachment) standard. Nevertheless, it should be understood that the invention is not limited thereto. The connection interface unit 402 may also be compatible to a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a UHS-I (Ultra High Speed-I) interface standard, a UHS-II (Ultra High Speed-II) interface standard, a SD (Secure Digital) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. In this exemplary embodiment, the connection interface unit 402 and the memory control circuit unit 404 may be packaged into one chip, or the connection interface unit 402 is distributed outside of a chip containing the memory control circuit unit.

The memory control circuit unit 404 is configured to execute a plurality of logic gates or control instructions which are implemented in form of hardware or firmware, so as to perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory storage module 406 includes multiple physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. Nevertheless, it should be understood that the present invention is not limited thereto. Each physical erasing unit is composed by 64 physical programming units, 256 physical programming units or any amount of the physical programming units.

More specifically, the physical erasing unit is the minimum unit for erasing. Namely, each physical erasing unit contains the least number of memory cells to be erased together. The physical programming unit is the minimum unit for programming. That is, the programming unit is the minimum unit for writing data. Each physical programming unit usually includes a data bit area and a redundancy bit area. The data bit area having multiple physical access addresses is used to store user data, and the redundant bit area is used to store system data (e.g., control information and error checking and correcting code). In the present exemplary embodiment, each data bit area of the physical programming unit contains 8 physical access addresses, and the size of each physical access address is 512 byte. However, in other exemplary embodiments, the data bit area may also include more or less of the physical access addresses, and the amount and the size of the physical access addresses are not limited in the present invention. For example, in one exemplary embodiment, the physical erasing unit is a physical block, and the physical programming unit is a physical page or a physical sector, but the invention is not limited thereto.

In the present exemplary embodiment, the rewritable non-volatile memory module 406 is a MLC (Multi Level Cell) NAND flash memory module (i.e., a flash memory module capable of storing two data bits in one memory cell). However, the disclosure is not limited thereto. The rewritable non-volatile memory module 406 may also be a SLC (Single Level Cell) NAND flash memory module, (i.e., a flash memory module capable of storing one data bit in one memory cell), a TLC (Trinary Level Cell) NAND flash memory module (i.e., a flash memory module capable of storing three data bits in one memory cell), other flash memory modules or any memory module having the same features.

Figure 5:
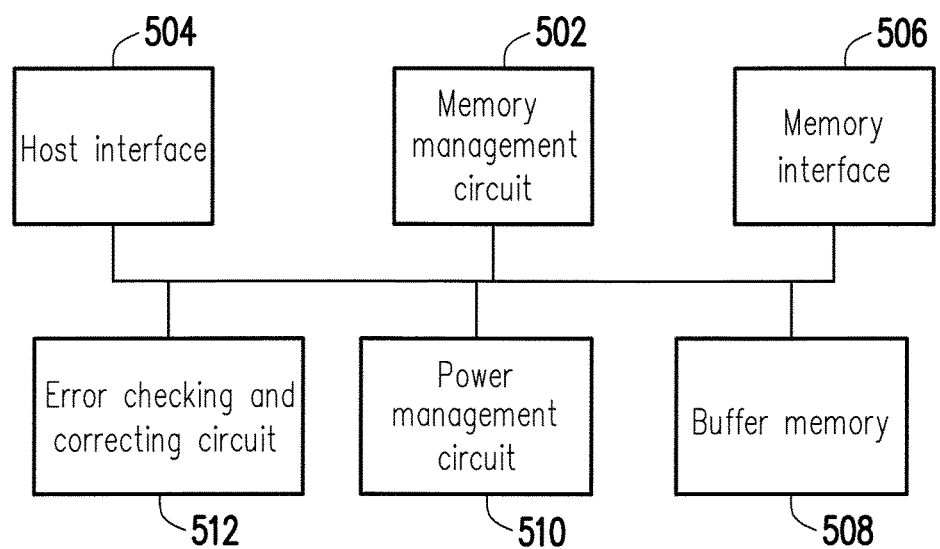
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 404 includes a memory management circuit 502, a host interface 504, a memory interface 506, a buffer memory 508, a power management circuit 510, and an error checking and correcting circuit 512.

The memory management circuit 502 is configured to control overall operations of the memory control circuit unit 404. Specifically, the memory management circuit 502 has a plurality of control instructions. During operations of the memory storage device 10, the control instructions are executed to perform various operations such as writing, reading and erasing data.

In this exemplary embodiment, the control instructions of the memory management circuit 502 are implemented in form of firmware. For instance, the memory management circuit 502 has a microprocessor unit (not illustrated) and a read-only memory (not illustrated), and the control instructions are burnt into the read-only memory. During the operations of the memory storage device 10, the control instructions are executed by the microprocessor to perform operations of writing, reading or erasing data.

In another exemplary embodiment, the control instructions of the memory management circuit 502 may also be stored into a specific area (for example, a system area in the memory module exclusively used for storing the system data) of the rewritable non-volatile memory module 406 as program codes. In addition, the memory management circuit 502 has a microprocessor unit (not illustrated), a ROM (not illustrated) and a RAM (not illustrated). Particularly, the ROM has a boot code, which is executed by the microprocessor unit to load the control instructions stored in the rewritable non-volatile memory module 406 to the RAM of the memory management circuit 502 when the memory control circuit unit 404 is enabled. Thereafter, the control instructions are executed by the microprocessor unit to perform operations of writing, reading or erasing data.

Further, in another exemplary embodiment, the control instructions of the memory management circuit 502 may also be implemented in a form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory management circuit is configured to manage the physical erasing units of the rewritable non-volatile memory module 406; the memory writing circuit is configured to issue a write command to the rewritable non-volatile memory module 406 in order to write data into the rewritable non-volatile memory module 406; the memory reading circuit is configured to issue a read command to the rewritable non-volatile memory module 406 in order to read data from the rewritable non-volatile memory module 406; the memory erasing circuit is configured to issue an erase command to the rewritable non-volatile memory module 406 in order to erase data from the rewritable non-volatile memory module 406; the data processing circuit is configured to process both the data to be written to the rewritable non-volatile memory module 406 and the data to be read from the rewritable non-volatile memory module 406.

The host interface 504 is coupled to the memory management circuit 502 and configured to couple to the connection interface unit 402, so as to receive and identify commands and data sent from the host system 11. In other words, the commands and the data sent from the host system 11 are passed to the memory management circuit 502 through the host interface 504. In this exemplary embodiment, the host interface 504 is compatible with the SATA standard. However, it should be understood that the present invention is not limited thereto, and the host interface 504 may also be compatible with a PATA standard, an IEEE 1394 standard, a PCI Express standard, a USB standard, a UHS-I standard, a UHS-II standard, a SD standard, a MS standard, a MMC standard, a CF standard, an IDE standard, or other suitable standards for data transmission.

The memory interface 506 is coupled to the memory management circuit 502 and configured to access the rewritable non-volatile memory module 406. That is, data to be written to the rewritable non-volatile memory module 406 is converted to a format acceptable to the rewritable non-volatile memory module 406 through the memory interface 506.

The buffer memory 508 is coupled to the memory management circuit 502 and configured to temporarily store data and commands from the host system 11 or data from the rewritable non-volatile memory module 406.

The power management unit 510 is coupled to the memory management circuit 502 and configured to control a power of the memory storage device 10.

The error checking and correcting circuit 512 is coupled to the memory management circuit 502 and configured to perform an error checking and correcting procedure to ensure the correctness of data. Specifically, when the memory management circuit 502 receives a write command from the host system 11, the error checking and correcting circuit 512 generates an ECC code (Error Checking and Correcting Code) for data corresponding to the write command, and the memory management circuit 502 writes data and the ECC code corresponding to the write command into the rewritable non-volatile memory module 406. Subsequently, when the memory management circuit 502 reads the data from the rewritable non-volatile memory module 406, the error checking and correcting code corresponding to the data is also read, and the error checking and correcting circuit 512 may perform the error checking and correcting procedure for the read data according to the error checking and correcting code.

Figure 6:
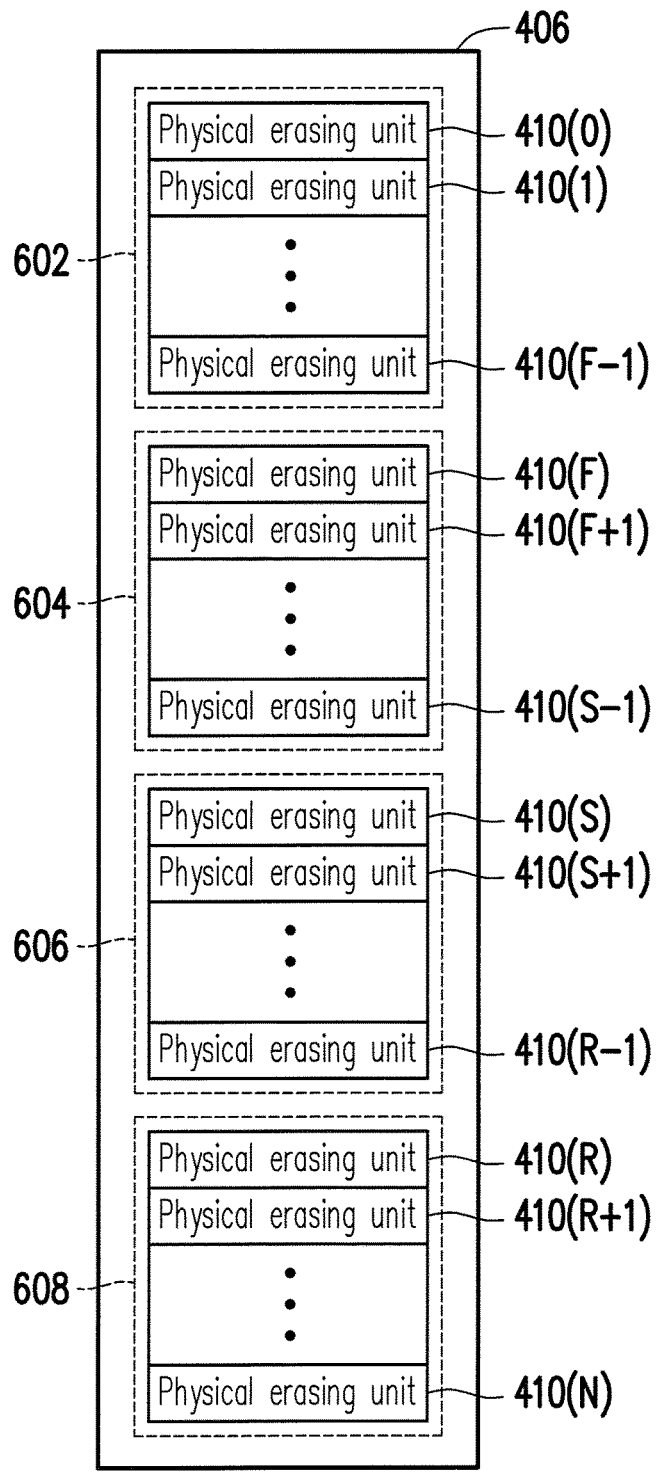
FIG. 6 and FIG. 7 are schematic diagrams illustrating a management of the physical erasing units according to an exemplary embodiment.
Figure 7:
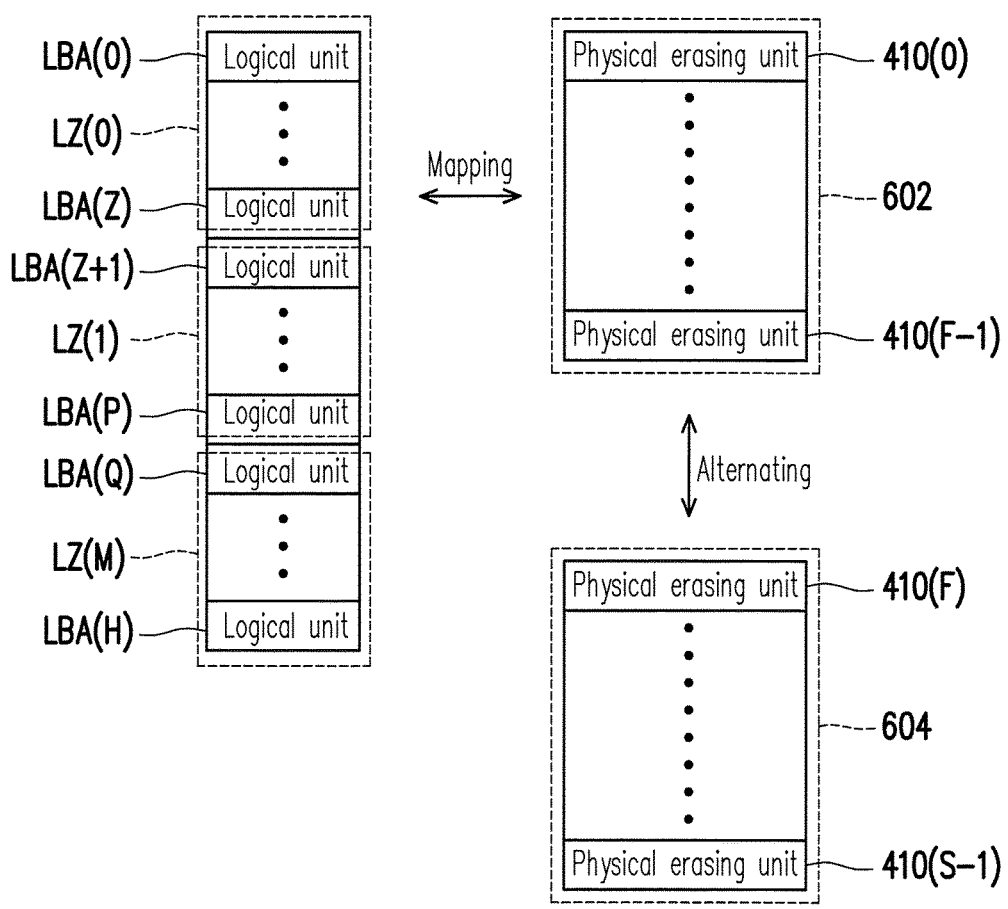

FIG. 6 and FIG. 7 are schematic diagrams illustrating a management of the physical erasing units according to an exemplary embodiment.

It should be understood that terms, such as "get", "select", "group", "divide", "associate" and so forth, are logical concepts which describe operations in the physical erasing units of the rewritable non-volatiles memory module 406. That is, the physical erasing units of the rewritable non-volatile memory module are logically operated, but actual positions of the physical units of the rewritable non-volatile memory module are not changed.

Referring to FIG. 6, the memory control circuit unit 404 (or the memory management circuit 502) may logically group the physical erasing units 410(0) to 410(N) into a data area 602, a spare area 604, a system area 606 and a replacement area 608.

The physical erasing units logically belonging to the data area 602 and the spare area 604 are configured to store data from the host system 11. More specifically, the physical erasing units of the data area 602 are regarded as the physical erasing units stored with the data, whereas the physical erasing units of the spare area 604 are configured to replace the physical erasing units of the data area 602. In other words, when the write command and the data to be written are received from the host system 11, the memory management unit 502 selects the physical erasing units from the spare area 604, and writes the data into the selected physical erasing units in order to replace the physical erasing units in the data area 602.

The physical erasing units logically belonging to the system area 606 are configured to record system data. For example, the system data includes information related to manufacturer and model of the rewritable non-volatile memory module, the number of physical erasing units in the rewritable non-volatile memory module, the number of the physical programming units in each physical erasing unit, and so forth.

The physical erasing units logically belonging to the replacement area 608 are used in a bad physical erasing unit replacement procedure for replacing damaged physical erasing units. More specifically, if normal physical erasing units are still available in the replacement area 608 when the physical erasing units of the data area 602 are damaged, the memory management circuit 502 selects the normal physical erasing units from the replacement area 608 for replacing the damaged physical erasing units.

Particularly, the numbers of the physical erasing units in the data area 602, the spare area 604, the system area 606 and the replacement area 608 may be different from one another according to the different memory specifications. In addition, it should be understood that, during operations of the memory storage device 10, grouping relations of the physical erasing units for associating with the data area 602, the spare area 604, the system area 606, and the replacement area 608 may be dynamically changed. For example, when the damaged physical erasing units in the spare area 604 are replaced by the physical erasing units in the replacement area 608, the physical erasing units originally from the replacement area 608 are associated with the spare area 604.

Referring to FIG. 7, the memory control circuit unit 404 (or the memory management circuit 502) is configured with logical units LBA(0) to LBA(H) for mapping the physical erasing units of the data area 602, wherein each of the logical units includes a plurality of logical sub units for mapping to the corresponding physical programming units of the physical erasing units. Further, when the host system 11 intends to write the data into the logical units or update the data stored in the logical units, the memory control circuit unit 404 (or the memory management circuit 502) selects one physical erasing units from the spare area 604 for writing the data as an alternately exchange of the physical erasing units of the data area 602. In this exemplary embodiment, the logical sub-units may be logical pages or logical sectors.

In order to identify which of the physical erasing units is stored with the data of each logical unit, the memory control circuit unit 404 (or the memory management circuit 502) may record the mapping relations between the logical units and the physical erasing units in the present exemplary embodiment. Further, when the host system 11 intends to access the data in the logical sub-unit, the memory control circuit unit 404 (or the memory management circuit 502) confirms the logical unit to which the logical sub-unit belongs, and accesses the data in the physical erasing unit mapped to said logical unit. For instance, in the present exemplary embodiment, the memory control circuit unit 404 (or the memory management circuit 502) may store a logical address-physical address mapping table into the rewritable non-volatile memory module 406 for recording the physical erasing units mapped to each of the logical units, and the logical address-physical address mapping table is loaded into the buffer memory 508 for maintenance when the memory control circuit unit 404 (or the memory management circuit 502) intends to the access the data.

It should be noted that, the mapping table cannot record the mapping relation for all of the logical units because a capacity of the buffer memory 508 is limited. Therefore, in the present exemplary embodiment, the memory control circuit unit 404 (or the memory management circuit 502) groups the logical units LBA(0) to LBA(H) into a plurality of logical zones LZ(0) to LZ(M), and configures one logical address-physical address mapping table for each of the logical zones. In particular, when the memory control circuit unit 404 (or the memory management circuit 502) intends to update the mapping table for one specific logical unit, the logical address-physical address mapping table of the logical zone to which the logical unit belongs is correspondingly loaded into the buffer memory 508 for updating.

After the memory storage device 10 is powered on (enabled), the memory control circuit unit 404 (or the memory management circuit 502) performs an initialization operation so the memory storage device 10 enters a standby state for receiving and processing the commands from the host system 11, which allows the memory storage device 10 to operate normally during a run time. For example, during the initialization operation, the memory control circuit unit 404 (or the memory management circuit 502) updates a logical-physical mapping table, so that the host system 11 may normally access the data stored in the rewritable non-volatile memory module 406.

However, when data is programmed into one physical erasing unit of the rewritable non-volatile memory module 406, the physical erasing unit may show an unstable state if an abnormal power off occurs during the programming. For example, when electric charge stored by the physical erasing unit is in the unstable state, existence of a dancing bit may be found in the physical erasing unit. Particularly, when the dancing bit exists in one physical erasing unit, even if the data of the physical erasing unit may be correctly read, the data may still be lost after a period of time. For example, if the dancing bit exist in one specific physical erasing unit, during the initialization operation after the memory storage device 10 is powered on (i.e., before the initialization operation is expired), the memory control circuit unit 404 (or the memory management circuit 502) may read the correct data from the specific physical erasing unit, or the number of error bits of the data being read is not greater than a maximum error bits amount correctable by the error checking and correcting circuit 512. However, during the run time after the initialization operation is completed (i.e., after the initialization operation is expired), when the memory control circuit unit 404 (or the memory management circuit 502) intends to read the data of the specific physical erasing unit, the number of error bits of the data being read may become greater than the maximum error bits amount correctable by the error checking and correcting circuit 512 to cause the reading errors.

Generally, the last programmed physical erasing unit before the memory storage device 10 is powered off may be in the unstable state. Accordingly, in an exemplary embodiment, during the initialization operation after the memory storage device 10 is powered on, while scanning the last programmed physical erasing unit before power off (hereinafter, also known as a first physical erasing unit), the memory control circuit unit 404 (or the memory management circuit 502) repeatedly performs a reading operation on the last programmed physical programming unit (hereinafter, also known as a first physical programming unit) for N times. N is a positive integer, which may be determined according to an execution time of the initialization operation. In other words, a predetermined count may be set in advance for the reading operation to be performed. For example, in an exemplary embodiment, the predetermined count may be set equal to the maximum reading count performable before the initialization operation is expired. Alternatively, in another exemplary embodiment, the predetermined count may be set to 1. However, the predetermined count may also be set based on requirements in practical application, and is not particularly limited by the invention.

More particularly, the memory control circuit unit 404 (or the memory management circuit 502) is preset to perform the reading operation on the first physical programming unit for N times. In the reading operation performed each time on the first physical programming unit, if the data may be correctly read, the memory control circuit unit 404 (or the memory management circuit 502) then performs the next reading operation on the first physical programming unit. Meanwhile, the memory control circuit unit 404 (or the memory management circuit 502) also counts a repeatedly reading count by, for example, adding one to the repeatedly reading count each time after the reading operation is performed. In the reading operation performed for N times on the first physical programming unit, if the number of error bits of the data read each time is not greater than an error bits amount threshold, the memory control circuit unit 404 (or the memory management circuit 502) determines that the data stored by the first physical programming unit is correctable data. Further, the memory control circuit unit 404 (or the memory management circuit 502) updates the logical-physical mapping table according to the first physical programming unit. For example, a mapping relation of the first physical programming unit and a corresponding logical programming unit into the logical-physical mapping table in the rewritable non-volatile memory module 406. If any time the number of error bits of the data read is greater than the error bits amount threshold, the memory control circuit unit 404 (or the memory management circuit 502) determines that the data stored by the first physical programming unit is uncorrectable data and abandons the data stored in the first physical programming unit. For example, the logical-physical mapping table is not updated according to the first physical programming unit, or the data stored in the first physical programming unit is marked as invalid data.

The error bits amount threshold may be set according to correction capability of the error checking and correcting circuit 512. For example, the error bits amount threshold may be set to the maximum error bits amount correctable by the error checking and correcting circuit 512. However, the error bits amount threshold may also be set based on requirements in practical application, and is not particularly limited by the present invention.

It is worth mentioning that, if the data to be programmed into the first physical programming unit is for updating the data of one specific logical programming unit, it means that mapping information corresponding to the specific logical programming unit already exists in the logical-physical mapping table before the data is written into the first physical programming unit. If the data in the first physical programming unit is determined as the correctable data, the memory control circuit unit 404 (or the memory management circuit 502) may update the logical-physical mapping table in a manner of overriding the old mapping information by the new mapping information which maps the specific logical programming unit to the first physical programming unit. On the other hand, if the data to be programmed into the first physical programming unit is new data to be written into one specific logical programming unit, it means that mapping information corresponding to the specific logical programming unit is not recorded in the logical-physical mapping table before the data is written into the first physical programming unit. In this case, if the data in the first physical programming unit is determined as the correctable data, the memory control circuit unit 404 (or the memory management circuit 502) may update the logical-physical mapping table in a manner of adding the mapping information which maps the specific logical programming unit to the first physical programming unit.

In the present exemplary embodiment, the logical-physical mapping table is updated only when the data of the first physical programming unit is determines as the correctable data. Therefore, if the data in the first physical programming unit is the uncorrectable data, the memory control circuit unit 404 (or the memory management circuit 502) does not read the data stored in the first physical programming unit according to the logical-physical mapping table during the run time after the initialization operation is expired.

Figure 8A:
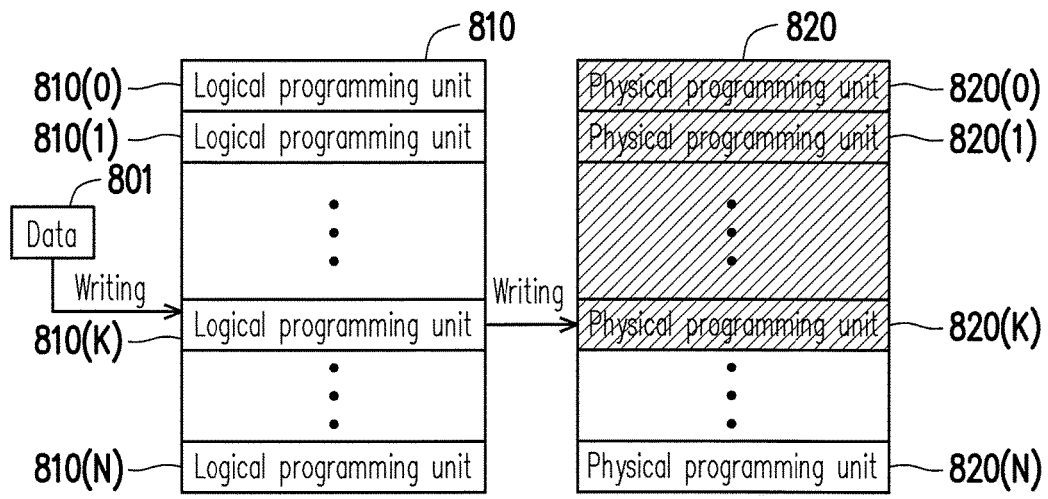
FIG. 8A is a schematic diagram illustrating the last programmed physical erasing unit before the memory storage device is powered off according to an exemplary embodiment.

FIG. 8A is a schematic diagram illustrating the last programmed physical erasing unit before the memory storage device is powered off according to an exemplary embodiment.

Referring to FIG. 8A, the memory control circuit unit 404 (or the memory management circuit 502) receives a read command instructing to write data 801 into a logical programming unit 810(K) of a logical erasing unit 810. Accordingly, the memory control circuit unit 404 (or the memory management circuit 502) writes the data 801 into a physical programming unit 820(K) of a physical erasing unit 820. Meanwhile, an abnormal power off occurs on the memory storage device 10. In other words, the physical erasing unit 820 is the last programmed physical erasing unit before the memory storage device 10 is powered off, and the physical programming unit 820(K) is the last programmed physical programming unit before the memory storage device 10 is powered off (the physical programming units programmed with data are marked by slash lines).

In the present exemplary embodiment, the memory control circuit unit 404 (or the memory management circuit 502) may store the data 801 and a corresponding error checking and correcting code together into the physical programming unit 820(K). When the reading operation is performed, the memory control circuit unit 404 (or the memory management circuit 502) may count the number of error bits of the read data according to the corresponding error checking and correcting code.

Figure 8B:
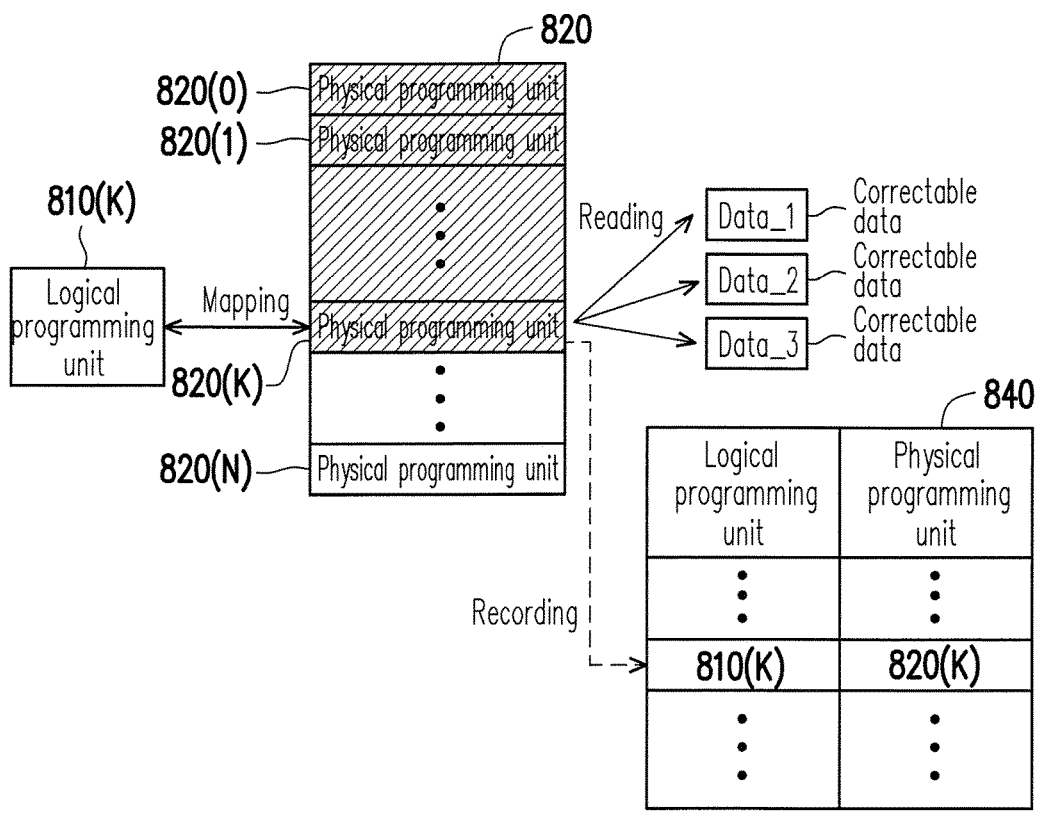
FIG. 8B is a schematic diagram illustrating the reading operation repeatedly performed on the last programmed physical programming unit before power off according to an exemplary embodiment.

FIG. 8B is a schematic diagram illustrating the reading operation repeatedly performed on the last programmed physical programming unit before power off according to an exemplary embodiment.

Referring to FIG. 8A and FIG. 8B, in the present exemplary embodiment, the physical erasing unit 820 is the last programmed physical erasing unit before the memory storage device 10 is powered off. Therefore, after the memory storage device 10 is powered on again, while scanning the physical erasing unit 820, the memory control circuit unit 404 (or the memory management circuit 502) repeatedly performs the reading operation on the last programmed physical programming unit 820(K). In the present exemplary embodiment, it is assumed that the execution time of the initialization operation is one second and the reading operation is to be repeatedly performed on the physical programming unit 820(K) for 3 times before the initialization operation is expired, i.e., the predetermined count is set to 3. The error bits amount threshold is set to 20. If the number of error bits of the read data is not greater than the error bits amount threshold, the memory control circuit unit 404 (or the memory management circuit 502) determines that the read data is the correctable data; otherwise, the read data is the uncorrectable data.

As shown in FIG. 8B, when the reading operation is performed on the physical programming unit 820(K) for the first time, the memory control circuit unit 404 (or the memory management circuit 502) counts that the repeatedly reading count is 1 and the number of error bits of read data Data_1 is 8. Since the repeatedly reading count is less than the predetermined count and the number of error bits of the data Data_1 is less than the error bits amount threshold (i.e., the data Data_1 is the correctable data), the memory control circuit unit 404 (or the memory management circuit 502) continues to perform the reading operation on the physical programming unit 820(K) for the second time. When reading operation is performed for the second time, the memory control circuit unit 404 (or the memory management circuit 502) counts that the repeatedly reading count is 2 and the number of error bits of read data Data_2 is 20. Since the repeatedly reading count is less than the predetermined count and the number of error bits of the data Data_2 is equal to the error bits amount threshold, the memory control circuit unit 404 (or the memory management circuit 502) continues to perform the reading operation on the physical programming unit 820(K) for the third time. When reading operation is performed for the third time, the memory control circuit unit 404 (or the memory management circuit 502) counts that the repeatedly reading count is 3 and the number of error bits of read data Data_3 is 16. Since the repeatedly reading count is equal to the predetermined count and the number of error bits of the data Data_3 is less than the error bits amount threshold (i.e., the data Data_3 is the correctable data), it means that the correctable data may be read in the reading operation performed each time on the physical programming unit 820(K) for the predetermined count. Therefore, the memory control circuit unit 404 (or the memory management circuit 502) determines that the correctable data may be read from the physical programming unit 820(K). Thereafter, the memory control circuit unit 404 (or the memory management circuit 502) updates a logical-physical mapping table 840 according to the physical programming unit 820(K). For example, logical-physical mapping information which maps the logical programming unit 810(K) to the physical programming unit 820(K) is recorded into the logical-physical mapping table 840.

Noted that, in the present exemplary embodiment, the predetermined count is 3 and the error bits amount threshold is 20. Nevertheless, in other exemplary embodiments, the predetermined count may be set to be greater or less than 3, and the error bits amount threshold may also be set to be greater than or less than 20. The present invention is not limited to the above. Further, in the present exemplary embodiment, although the determination mechanism is described by using whether the repeatedly reading count is less than or equal to (not greater than) the predetermined count; however, whether the repeatedly reading count is greater than the predetermined count may also be used as the determination mechanism in other exemplary embodiments. The present invention is not intended to limit the determination mechanism between the repeatedly reading count and the predetermined count, and it belongs to the determination mechanism of the present invention as long as whether the reading operation is repeatedly performed for the predetermined count and whether the correctable data is read each time may both be determined.

Figure 8C:
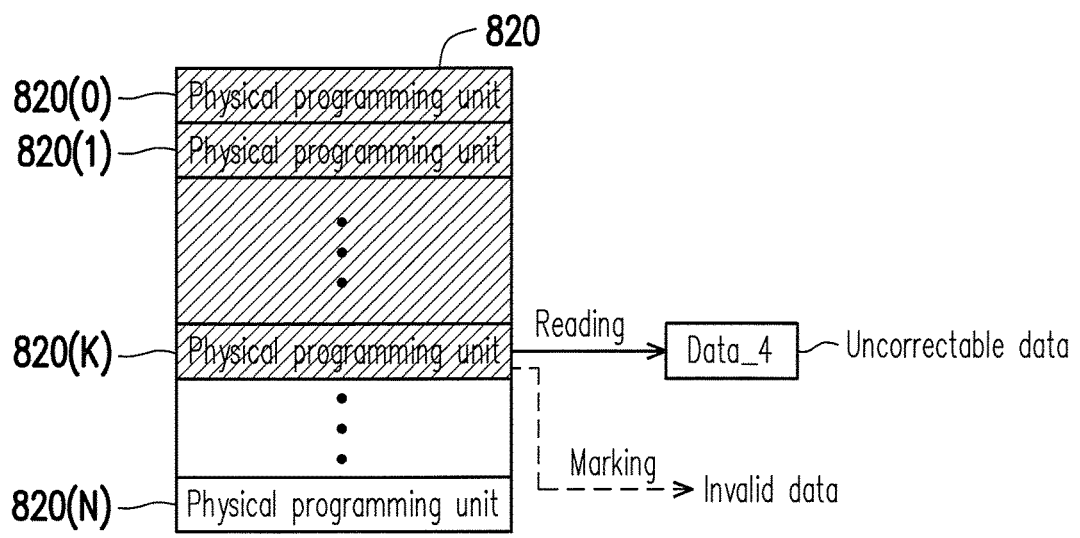
FIG. 8C is a schematic diagram illustrating the reading operation repeatedly performed on the last programmed physical programming unit before power off according to another exemplary embodiment.

FIG. 8C is a schematic diagram illustrating the reading operation repeatedly performed on the last programmed physical programming unit before power off according to another exemplary embodiment.

Referring to FIG. 8A and FIG. 8C, when the memory storage device 10 is powered on again, while scanning the physical erasing unit 820, the memory control circuit unit 404 (or the memory management circuit 502) repeatedly performs the reading operation on the last programmed physical programming unit 820(K). In the present exemplary embodiment, when the reading operation is performed on the physical programming unit 820(K) for the first time, it is counted that the number of error bits of read data Data_4 is 32. Since the number of error bits of the data Data_4 is greater than the error bits amount threshold (i.e., the data Data_4 is the uncorrectable data), the memory control circuit unit 404 (or the memory management circuit 502) does not continue to perform the next reading operation. In other words, the memory control circuit unit 404 (or the memory management circuit 502) determines that the correctable data cannot be read from the physical programming unit 820(K), and thus the memory control circuit unit 404 (or the memory management circuit 502) does not update the logical-physical mapping table 840 according to the physical programming unit 820(K). Further, the memory control circuit unit 404 (or the memory management circuit 502) marks the data stored in the physical programming unit 820(K) as invalid data. Therefore, if the logical-physical mapping information corresponding to the logical programming unit 810(K) already exists in the logical-physical mapping table 840, the memory control circuit unit 404 (or the memory management circuit 502) does not read the data stored by the physical programming unit 820(K) when reading the logical programming unit 810(K) according to the logical-physical mapping table 840 during the run time. As such, the reading errors may be prevented.

In the foregoing exemplary embodiments, the predetermined count N is set to be greater than 1, which means that the memory control circuit unit 404 (or memory management circuit 502) performs the reading operation on the last programmed physical programming unit (hereinafter, also known as the first physical programming unit) for multiple times during the initialization operation performed after the power is on. In another exemplary embodiment, the predetermined count N is set to 1, which means that the memory control circuit unit 404 (or memory management circuit 502) performs the reading operation on the first physical programming unit for only once during the initialization operation performed after the power is on. In the present exemplary embodiment, while scanning the first physical erasing unit (i.e., the last programmed physical erasing unit before power off), the memory control circuit unit 404 (or the memory management circuit 502) determines whether it is required to back up the first physical programming unit. Specifically, in the reading operation performed on the first physical programming unit, after reading data from the first physical programming unit and counting the number of error bits of the read data, the memory control circuit unit 404 (or the memory management circuit 502) determines whether the number of error bits is greater than the error bits amount threshold, so as to determine whether the read data is the correctable data. If the counted number of error bits is not greater than the error bits amount threshold, it means that the read data is the correctable data. Then, the memory control circuit unit 404 (or the memory management circuit 502) selects another physical erasing unit (hereinafter, also known as a second physical erasing unit) in the rewritable non-volatile memory module 406 to serve as a backup physical erasing unit, and stores the correctable data read from the first physical programming unit of the first physical erasing unit into the second physical erasing unit. In the present exemplary embodiment, the memory control circuit unit 404 (or the memory management circuit 502) stores the corrected data into the second physical erasing unit. Moreover, the memory control circuit unit 404 (or the memory management circuit 502) further updates the logical-physical mapping table according to the second physical erasing unit rather than updating the logical-physical mapping table according to the first physical erasing unit. For example, the memory control circuit unit 404 (or the memory management circuit 502) records a mapping relation of a physical programming unit that stores the data (hereinafter, also known as a second physical programming unit) in the second physical erasing unit and the corresponding logical programming unit into the physical-logical mapping table. During the run time, the memory control circuit unit 404 (or the memory management circuit 502) may read the data from the second physical erasing unit according to the physical-logical mapping table. Because the second physical erasing unit is not in the unstable state (e.g., the dancing bit does not exist), the data may be correctly read.

Figure 9:
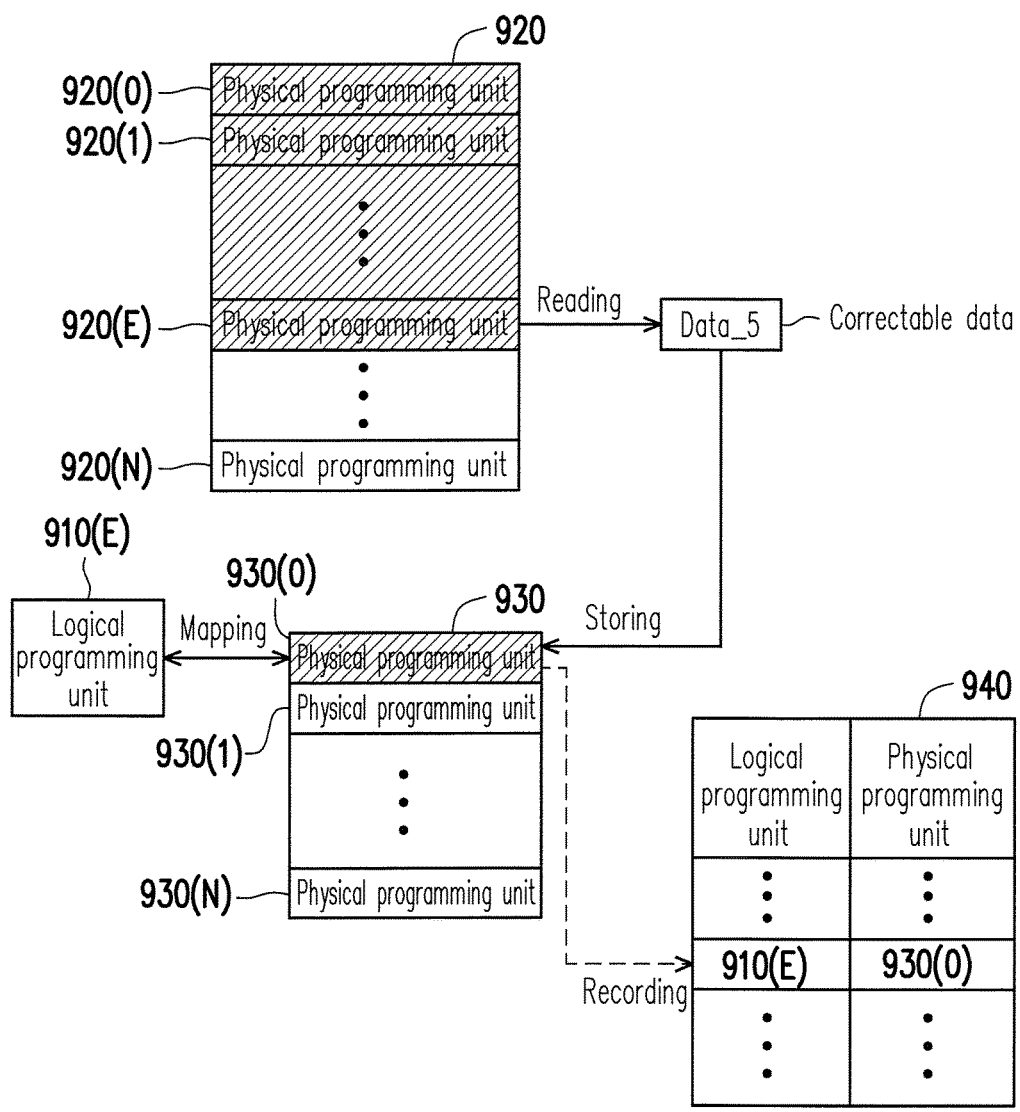
FIG. 9 is a schematic diagram illustrating the operation of storing the data of the last programmed physical programming unit before power off into another physical erasing unit according to another exemplary embodiment.

FIG. 9 is a schematic diagram illustrating the operation of storing the data of the last programmed physical programming unit before power off into another physical erasing unit according to another exemplary embodiment.

Referring to FIG. 9, it is assumed that the physical erasing unit 920 is the last programmed physical erasing unit before the memory storage device 10 is powered off, and the physical programming unit 920(E) is the last programmed physical programming unit before the memory storage device 10 is powered off (the physical programming units programmed with data are marked by slash lines). The data programmed to the physical programming unit 920(E) before the memory storage device 10 is powered off belongs to a logical programming unit 910(E). In the present exemplary embodiment, it is assumed that the predetermined count N is set to 1. After the memory storage device 10 is powered on, the memory control circuit unit 404 (or the memory management circuit 502) reads data from the physical programming unit 920(E), and counts the number of error bits of read data Data_5. In the present exemplary embodiment, it is assumed that the number of error bits of the data Data_5 is not greater than the error bits amount threshold, which means that the data Data_5 is the correctable data. Therefore, the memory control circuit unit 404 (or the memory management circuit 502) selects a physical erasing unit 930 from the rewritable non-volatile memory module 406, and stores the read data Data_5 into a physical programming unit 930(0) of the physical erasing unit 930. Furthermore, the memory control circuit unit 404 (or the memory management circuit 502) records a mapping relation of the logical programming unit 910(E) and the physical programming unit 930(0) into a logical-physical mapping table 940.

In the present exemplary embodiment, it is assumed that the physical erasing units of the rewritable non-volatile memory module 406 may be programmed by using a multiple layer cell (MLC) programming mode, a Trinary level cell (TLC) programming mode or other similar modes.

Nonetheless, the memory control circuit unit 404 (or the model 502) may also program the backup physical erasing unit by using a single layer memory cell (SLC) mode, a lower physical programming mode, a mixture programming mode or a less layer memory cell mode. In the single layer memory cell mode, one memory cell is only stored with data of one bit. In the lower physical programming mode, only the lower physical programming units are programmed while the upper physical programming units corresponding to the lower physical programming units may not be programmed. In the mixture programming mode, valid data (or real data) are programmed into the lower physical programming units while dummy data is programmed into the upper physical programming units corresponding to the lower physical programming units sorted with the valid data. The present invention is not intended to limit the programming mode used for the backup physical erasing unit.

In the present exemplary embodiment, during the run time after the initialization operation is expired, if the data of the logical programming unit 910(E) is to be read before a first write command is received, the memory control circuit unit 404 (or the memory management circuit 502) may read the data from the physical programming unit 930(0) according to the logical-physical mapping table 940 rather than reading data from the physical programming unit 920(E).

Further, in the rewritable non-volatile memory module capable of storing two or more data bits in one memory cell, the memory control circuit unit 404 (or the memory management circuit 502) may also store the physical programming unit belonging to a pair page of the last programmed physical programming unit before power off into the backup physical erasing unit. Herein, the physical programming units belonging to the pair page refers to the physical programming units constituted by the same memory cells.

Figure 10:
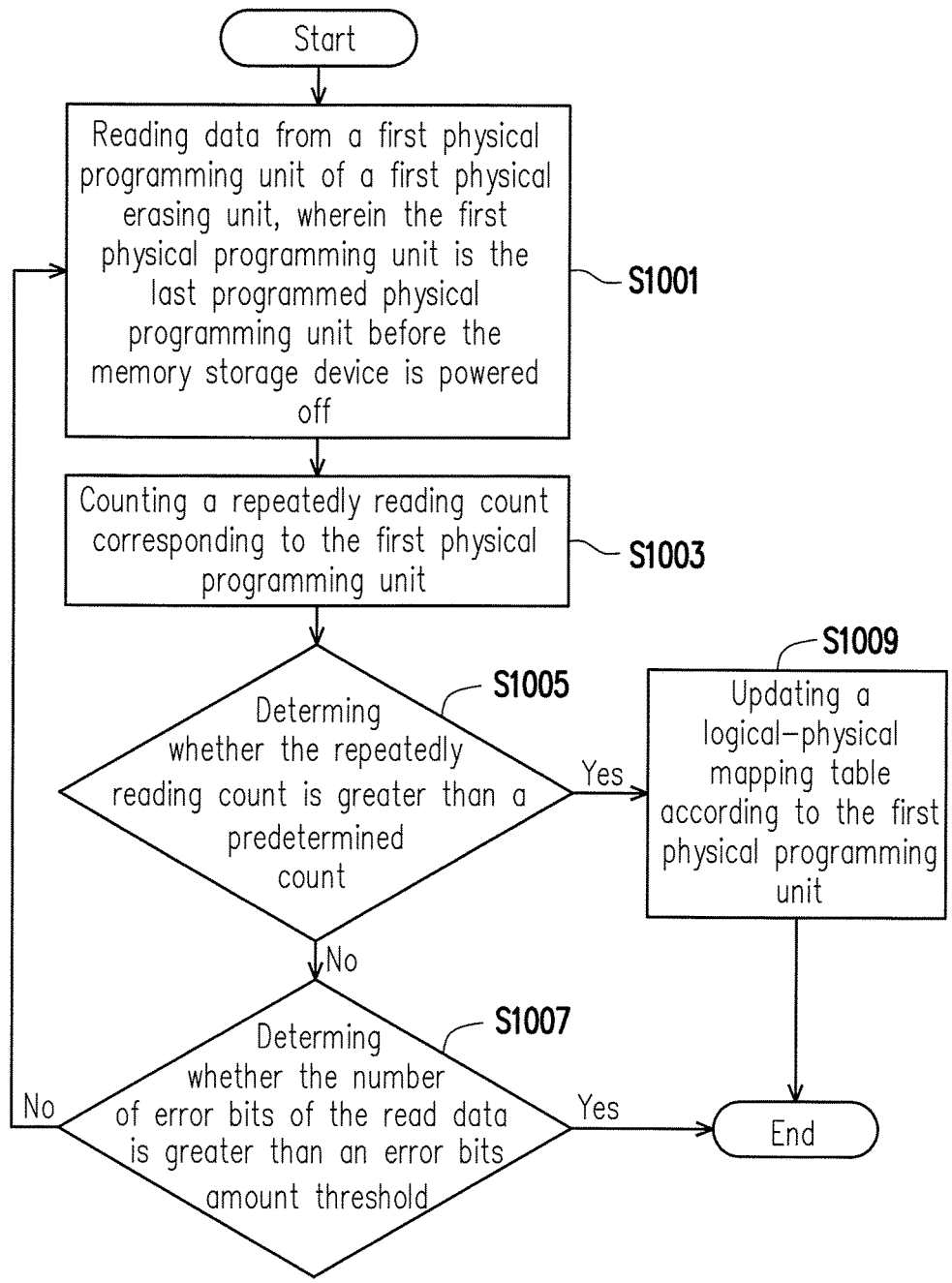
FIG. 10 is a flowchart of a data protecting method according to an exemplary embodiment.

FIG. 10 is a flowchart of a data protecting method according to an exemplary embodiment.

In step S1001, the memory control circuit unit 404 (or the memory management circuit 502) reads data from a first physical programming unit of a first physical erasing unit during an initialization operation after the memory storage device 10 is powered on. Herein, the first physical programming unit is the last programmed physical programming unit before the memory storage device 10 is powered off. The data stored in the first physical programming unit belongs to a logical programming unit.

In step S1003, the memory control circuit unit 404 (or the memory management circuit 502) counts a reading count corresponding to the first physical programming unit. For example, each time after the reading operation is performed on the first physical programming unit, the memory control circuit unit 404 (or the memory management circuit 502) adds one to the repeatedly reading count.

In step S1005, the memory control circuit unit 404 (or the memory management circuit 502) determines whether the repeatedly reading count is greater than a predetermined count.

If it is determined that the repeatedly reading count is not greater than the predetermined count, the memory control circuit unit 404 (or the memory management circuit 502) determines whether the number of error bits of the read data is greater than an error bits amount threshold in step S1007. Herein, the error bits amount threshold may be set according to correction capability of the error checking and correcting circuit. In addition, the memory control circuit unit 404 (or the memory management circuit 502) may count the number of error bits of the read data according to the corresponding error checking and correcting code.

If it is determined that the number of error bits is not greater than the error bits amount threshold, the memory control circuit unit 404 (or the memory management circuit 502) performs step S1001 again. In other words, if the repeatedly reading count is not greater than the predetermined count and the number of error bits is not greater than the error bits amount threshold, the memory control circuit unit 404 (or the memory management circuit 502) repeatedly performs the reading operation on the first physical programming unit. Moreover, the memory control circuit unit 404 (or the memory management circuit 502) also performs step S1003 and step S1005 again and determines whether to perform step S1007 according to a determination result of step S1005.

If it is determined that the repeatedly reading count is greater than the predetermined count, the memory control circuit unit 404 (or the memory management circuit 502) updates a logical-physical mapping table according to the first physical programming unit in step S1009.

In the present exemplary embodiment, the memory control circuit unit 404 (or the memory management circuit 502) performs each step among step S1001 to step S1009 by the sequence as shown in FIG. 10. However, the present invention is not limited thereto. For example, in another exemplary embodiment, after reading the data from the first physical programming unit (i.e., step S1001), the method may proceed to perform the operation of determining whether the repeatedly reading count is less than the predetermined count. If it is determined that the repeatedly reading count is less than the predetermined count, the method may proceed to perform the operation of determining whether the number of error bits is greater than the error bits amount threshold (i.e., step S1007), and the step of counting the repeatedly reading count may be performed when the number of error bits is greater than the error bits amount threshold.

Figure 11:
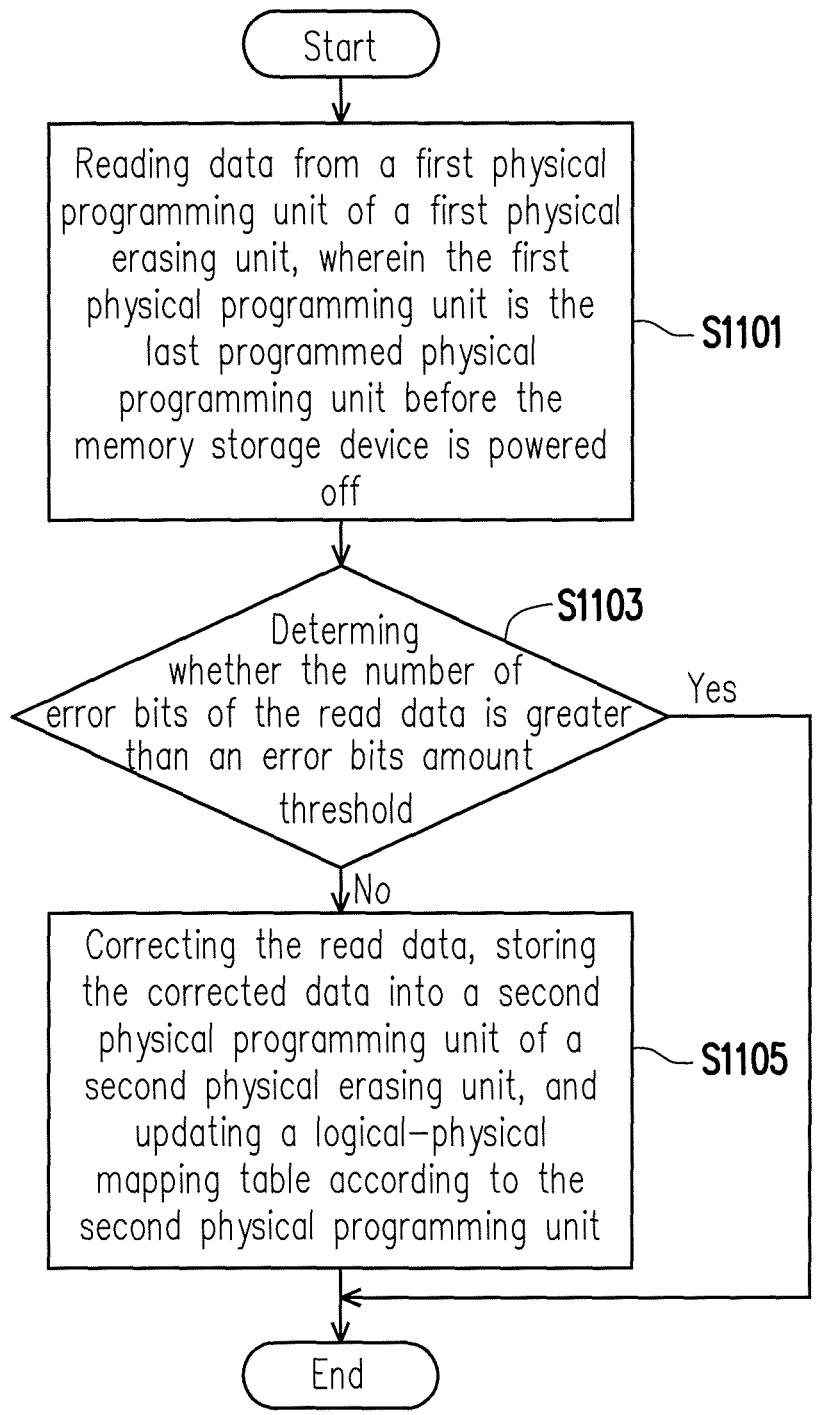
FIG. 11 is a flowchart of a data protecting method according to another exemplary embodiment.

FIG. 11 is a flowchart of a data protecting method according to another exemplary embodiment.

In step S1101, the memory control circuit unit 404 (or the memory management circuit 502) reads data from a first physical programming unit of a first physical erasing unit during an initialization operation after the memory storage device 10 is powered on. Herein, the first physical programming unit is the last programmed physical programming unit before the memory storage device 10 is powered off, and the data stored in the first physical programming unit belongs to a logical programming unit. In the present exemplary embodiment, the predetermined count N is set equal to 1. In other words, the memory control circuit unit 404 (or the memory management circuit 502 performs the reading operation on the first physical programming unit for only once during the initialization operation after the memory storage device 10 is powered on.

In step S1103, the memory control circuit unit 404 (or the memory management circuit 502) determines whether the number of error bits of the read data is greater than an error bits amount threshold.

If the number of error bits is not greater than the error bits amount threshold, in step S1105, the memory control circuit unit 404 (or the memory management circuit 502) stores the read data into a second physical programming unit of a second physical erasing unit, and updates a logical-physical mapping table according to the second physical programming unit.

Details regarding each step in the flowcharts have been described in the foregoing embodiments, and thus related descriptions are not repeated hereinafter.

In summary, according to the present invention, whether the correctable data may be read from the physical programming unit is determined by repeatedly performing the reading operation on the physical programming unit in the unstable state during the initialization operation after the memory storage device is enabled, so as to further determine whether to keep the data in said physical programming unit or not. In addition, when the correction data may be read from the physical programming unit, the read correction data may be stored into the backup physical erasing unit. As a result, during the run time after the initialization operation is expired, reading of the uncorrectable data from the unstable physical programming unit may be prevented to ensure reliability and correctness of the data.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data protecting method for a memory storage device, the memory storage device having a rewritable non-volatile memory module, the rewritable non-volatile memory module comprising a plurality of physical erasing units, each of the physical erasing units comprising a plurality of physical programming units, the data protecting method comprising:
  repeatedly reading from a first physical programming unit of a first physical erasing unit among the physical erasing units and counting repeatedly reading count after reading the data every time during an initialization operation after the memory storage device is powered on, wherein the first physical programming unit is the last programmed physical programming unit before the memory storage device is powered off, and the data of the first physical programming unit;
  determining that the repeatedly reading count is greater than a predetermined count after reading the data every time and determining that a number of error bits of the data read each time is greater than an error bits amount threshold;
  not recording the mapping relation of the first physical programming unit and the logical programming unit in the logical-physical mapping table if the number of error bits is not greater than the error bits amount threshold and the predetermined count is one;
  correcting the read data, and storing the corrected data into a second physical programming unit of a second physical erasing unit among the physical erasing units; and
  recording a mapping relation of the second physical programming unit and the logical programming unit into a logical-physical mapping table.

2. The data protecting method of claim 1, wherein marking the data of the first physical programming unit as invalid data if the number of error bits is greater than the error bits amount threshold.

3. The data protecting method of claim 1, further comprising:
  receiving a read command instructing to read the logical programming unit; and
  reading the data of the second physical programming unit according to the logical-physical mapping table in response to the read command.

4. The data protecting method of claim 3, wherein the read command is received after the initialization operation is expired and before a first write command is received.

5. The data protecting method of claim 1, wherein the step of storing the corrected data into the second physical programming unit of the second physical erasing unit among the physical erasing units further comprises:
  storing data of at least one third physical programming unit of the first physical erasing unit into the second physical erasing unit, wherein the at least one third physical programming unit and the first physical programming unit are constituted by a plurality of same memory cells.

6. The data protecting method of claim 1, wherein the step of storing the corrected data into the second physical programming unit of the second physical erasing unit among the physical erasing units further comprises:
programming the corrected data into the second physical programming unit of the second physical erasing unit among the physical erasing units by using a single layer memory cell mode, a lower physical programming mode, a mixture programming mode or a less layer memory cell mode.

7. A memory control circuit unit for controlling a rewritable non-volatile memory module of a memory storage device, the rewritable non-volatile memory module comprising a plurality of physical erasing units, each of the physical erasing units comprising a plurality of physical programming units, the memory control circuit unit comprising:
a host interface configured to couple to a host system;
a memory interface configured to couple to the rewritable non-volatile memory module; and
a memory management circuit coupled to the host interface and the memory interface,
wherein the memory management circuit is configured to repeatedly read data from a first physical programming unit of a first physical erasing unit among the physical erasing units and counting a repeatedly reading count after reading the data every time during an initialization operation after the memory storage device is powered on, wherein the first physical programming unit is the last programmed physical programming unit before the memory storage device is powered off, and the data of the first physical programming unit belongs to a logical programming unit,
wherein the memory management circuit is further configured to determine that the repeatedly reading count is greater than a predetermined count after reading the data every time and determine that a number of error bits of the data read each time is greater than an error bits amount threshold,
wherein the memory management circuit does not record the mapping relation of the first physical programming unit and the logical programming unit into the logical-physical mapping table if the number of error bits is not greater than the error bits amount threshold and the predetermined count is one,
wherein the memory management circuit is further configured to correct the read data, and store the corrected data into a second physical programming unit of a second physical erasing unit among the physical erasing units,
wherein the memory management circuit is further configured to record a mapping relation of the second physical programming unit and the logical programming unit into the logical-physical mapping table.

8. The memory control circuit unit of claim 7, wherein the memory management circuit is further configured to mark the data of the first physical programming unit as invalid data if the number of error bits is greater than the error bits amount threshold.

9. The memory control circuit unit of claim 7, wherein the memory management circuit is further configured to receive a read command instructing to read the logical programming unit, and read the data of the second physical programming unit according to the logical-physical mapping table in response to the read command.

10. The memory control circuit unit of claim 9, wherein the memory management circuit receives the read command after the initialization operation is expired and before a first write command is received.

11. The memory control circuit unit of claim 7, wherein the memory management circuit is further configured to store data of at least one third physical programming unit of the first physical erasing unit into the second physical erasing unit if the number of error bits is not greater than the error bits amount threshold, wherein the at least one third physical programming unit and the first physical programming unit are constituted by a plurality of same memory cells.

12. The memory control circuit unit of claim 7, wherein the memory management circuit is further configured to program the corrected data into the second physical programming unit of the second physical erasing unit among the physical erasing units by using a single layer memory cell mode, a lower physical programming mode, a mixture programming mode or a less layer memory cell mode.

13. A memory storage device, comprising:
a connection interface unit configured to couple to a host system;
a rewritable non-volatile memory module comprising a plurality of physical erasing units; and
a memory control circuit unit coupled to the connection interface unit and the rewritable non-volatile memory module,
wherein the memory control circuit unit is configured to repeatedly read data from a first physical programming unit of a first physical erasing unit among the physical erasing units and counting a repeatedly reading count after reading the data every time during an initialization operation after the memory storage device is powered on, wherein the first physical programming unit is the last programmed physical programming unit before the memory storage device is powered off, and the data of the first physical programming unit belongs to a logical programming unit,
wherein the memory control circuit unit is further configured to determine that the repeatedly reading count is greater than a predetermined count after reading the data every time and determine that a number of error bits of the data read each time is greater than an error bits amount threshold,
wherein the memory control circuit unit does not record the mapping relation of the first physical programming unit and the logical programming unit into the logical-physical mapping table if the number of error bits is not greater than the error bits amount threshold and the predetermined count is one,
wherein the memory control circuit unit is further configured to correct the read data, and store the corrected data into a second physical programming unit of a second physical erasing unit among the physical erasing units,
wherein the memory control circuit unit is further configured to record a mapping relation of the second physical programming unit and the logical programming unit into a logical-physical mapping table.

14. The memory storage device of claim 13, wherein the memory control circuit unit is further configured to mark the data of the first physical programming unit as invalid data if the number of error bits is greater than the error bits amount threshold.

15. The memory storage device of claim 13, wherein the memory control circuit unit is further configured to receive a read command instructing to read the logical programming unit, and read the data of the second physical programming unit according to the logical-physical mapping table in response to the read command.

16. The memory storage device of claim 15, wherein the memory control circuit unit receives the read command after the initialization operation is expired and before a first write command is received.

17. The memory storage device of claim 13, wherein the memory control circuit unit is further configured to store data of at least one third physical programming unit of the first physical erasing unit into the second physical erasing unit if the number of error bits is not greater than the error bits amount threshold, wherein the at least one third physical programming unit and the first physical programming unit are constituted by a plurality of same memory cells.

18. The memory storage device of claim 13, wherein the memory control circuit unit is further configured to program the corrected data into the second physical programming unit of the second physical erasing unit among the physical erasing units by using a single layer memory cell mode, a lower physical programming mode, a mixture programming mode or a less layer memory cell mode.

\* \* \* \* \*